UNITED STATES PATENT OFFICE.

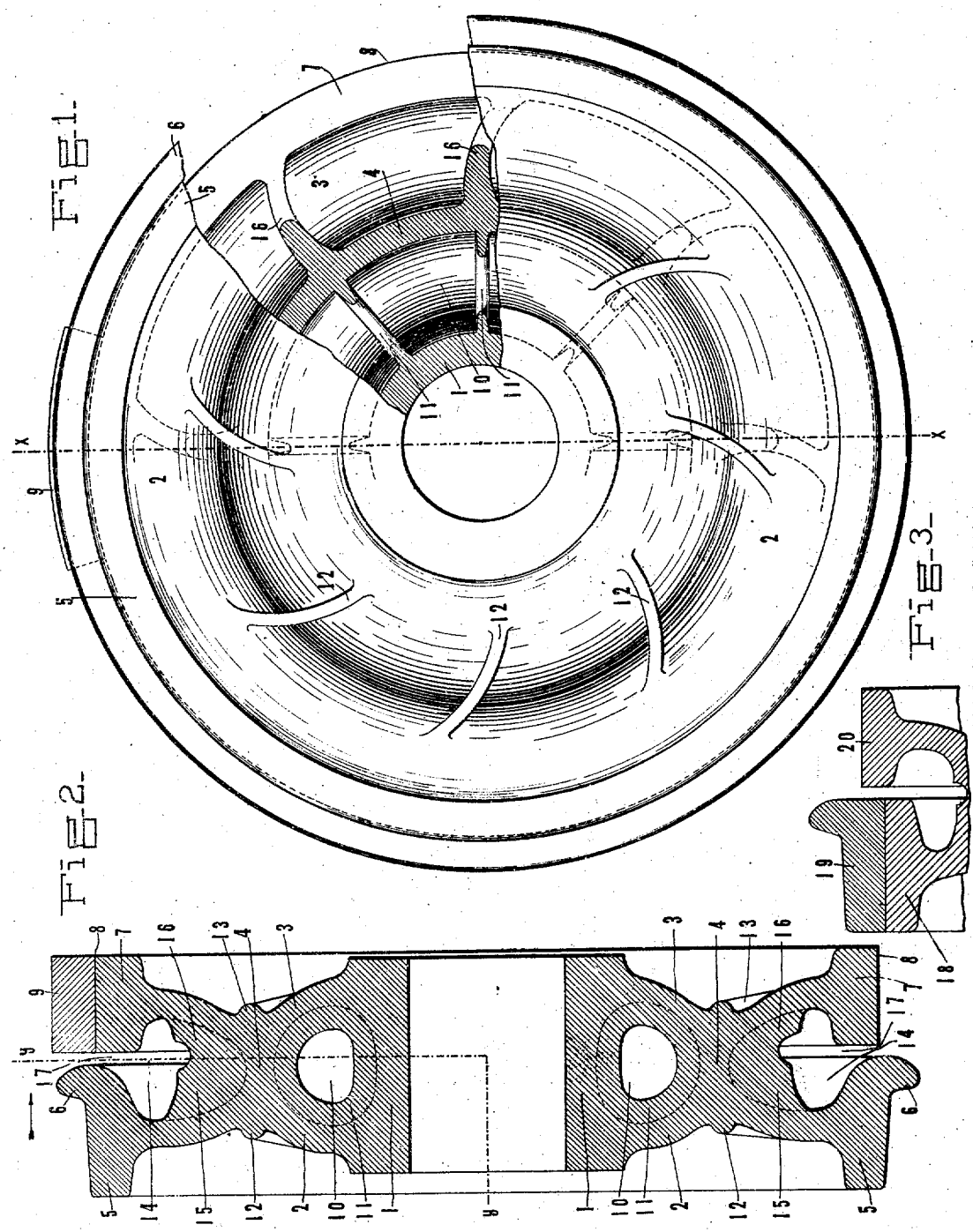

PATRICK H. GRIFFIN, OF BUFFALO, NEW YORK, ASSIGNOR TO HENRY F. GRIFFIN AND WILLIAM A. GRIFFIN, OF BUFFALO, NEW YORK.

BRAKING APPARATUS.

No. 868,777.      Specification of Letters Patent.      Patented Oct. 22, 1907.

Application filed January 28, 1907. Serial No. 354,365.

*To all whom it may concern:*

Be it known that I, PATRICK H. GRIFFIN, residing at Buffalo, in the county of Erie and State of New York, have invented certain new and useful Improvements in Braking Apparatus, of which the following is a full, clear, and exact description, such as will enable others skilled in the art to which it appertains to make and use the same.

This invention relates to braking apparatus. One of the objects thereof is to provide a form of braking apparatus susceptible of the hardest use without injury to the parts.

Another object is to provide apparatus of the above type in which the brakes may be efficiently and reliably applied without contact with the tread of the wheel.

Another object is to provide a car wheel of strong and durable construction in which the braking surface is isolated from the wheel tread.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawing, wherein is shown one or more of various possible embodiments of my invention,—Figure 1 is an elevation thereof, certain parts being broken away upon line *y—y* of Fig. 2 in order to show the construction more clearly. Fig. 2 is a sectional view taken substantially along the line *x—x* of Fig. 1. Fig. 3 is a sectional detail view of a slightly different embodiment.

Similar reference characters refer to similar parts throughout the several views of the drawing.

As tending to render more readily understood certain aims and features of this invention, it may here be noted that if a brake shoe be brought into direct contact with the tread of the wheel, as in certain forms of braking apparatus now in extensive use, the heat generated by the friction of braking and abrasion of the metal tends to develop minute cracks in the wheel tread which gradually extend inwardly and in time ruin the wheel. If a steel tired wheel, moreover, be employed, this action causes the tread surface to blister and peel away. Other injuries wrought to the wheel tread lie in the cutting of the inclined and curved surfaces thereof by the edges of new shoes, as well as the constant grinding and wearing away by brake shoes in whatever stage of wear. The braking action, itself, moreover, is highly inefficient until the face of the shoe has become worn to fit the inclined face of the wheel tread, inasmuch as the new shoe presents a face parallel to the axle, and even with the shoe and tread surface in perfect fit, there is a waste of the braking force in the component of the pressure parallel to the axle, as well as a tendency due to this force to displace the shoe in a lateral direction. The surface upon which the braking pressure is exerted, nevertheless, must be connected with the axle by means possessing a high degree of strength, as the twisting force or torque transmitted by these means during a sudden and severe application of the brakes rises to a high value, and it is essential from commercial considerations as well as considerations of safety that the entire braking system of a train be absolutely dependable. The above and other defects are eliminated without sacrifice of strength or reliability in constructions of the nature of that hereinafter described.

Referring now to the illustrative embodiment appearing in the accompanying drawing, there is shown an integral wheel having the hub 1 from which spring the inner and outer plates 2 and 3 respectively. These plates are connected as by the web 4, from which point they again separate, the plate 2 extending outwardly to support a rim 5 with a flange 6 of the well known construction. It may here be noted that although the web 4 in the illustrative embodiment shown connects the inner and outer plates of the wheel and thus forms the connecting means hereinafter referred to, nevertheless any means extending from one to the other of the plates or any integrality of the two plates adjacent this point would form in effect an equivalent connecting means within the intended scope of the corresponding claims following this description. The inner plate 3, which is of similar conformation to the outer plate 2, has formed thereon a ring 7 presenting a braking surface 8 preferably of cylindrical conformation. Upon this surface the braking effect is exerted, as by shoe 9, actuated by mechanism of any desired type.

Within the space 10 comprised between the inner and outer plates, the web 4 and the hub 1 are disposed ribs or brackets 11 of any desired number, and preferably radially disposed, although the same may be curved if desired. These brackets, while not adding materially to the weight of the wheel, form with the members embracing the space 10 a light and yet rigid body from which spring the inner and outer plates 3 and 2 as above described. Within the concaved surfaces of the outer and inner plates 2 and 3 are respectively disposed curved brackets 12 and 13 which, also, may be of any desired number and serve materially to stiffen the outer portion of the plates. There are also provided within the space 14 comprised between the plates, the wheel rim and the braking ring, brackets 15 and 16 which merge into one another toward the axle to form in effect a single integral projection binding the wheel plates one with another. These brackets are also curved, preferably in the same direction, in order to provide for expansion of the members at which they terminate at their outer ends, and plates 2 and 3 are curved for a like reason.

It will be seen that a wheel of the above type, aside from its peculiar adaptability to meet the conditions imposed upon it for efficient action, is of the simplest construction, it being necessary in casting merely to form dry sand cores for the spaces 10 and 14, these cores being suitably recessed to form the several brackets and being provided with the ordinary core prints for taking off the gas. The outer surface of the braking ring 7 is, moreover, preferably chilled in order best to adapt it to perform its functions, and it may be here noted that this surface may be provided with inserts or in any other way adapted for efficient braking, inasmuch as it is not called upon, as in ordinary constructions, to bear the weight of the car.

The ring 7 is preferably spaced from the flange 6 as shown at 17 in order to do away with the conducting of the heat to the wheel rim, and it may here be noted that although a substantial spacing as is indicated in the drawing has been found most efficient in action, nevertheless the term "spaced" as used throughout this specification and the following claims, is intended to cover a separation of any degree from a mere lack of integrality at this point to a wide separation of the parts. It may also here be noted that the term "ring" as used throughout is intended to comprise a member whether circular in form, as an annulus, or in contour only, as a disk.

The operation of the above described embodiment of my invention is substantially as follows: Assuming the brake shoe 9 to be applied to the surface 8 of the ring 7, the friction with a given force of application is a maximum due to the character of the braking surfaces, and the wearing away of the ring may be reduced to a low degree by the chilling of this part as above described. The surfaces moreover, even with a new brake shoe, fit one another exactly, as both are parallel to the axle and there is no lateral component due to an inclined disposition of the meeting surfaces. The retarding effect exerted on the ring, moreover, is transmitted by the plate 3 both to the web 4 and directly to the hub 1 in the same manner as though it were exerted upon the wheel rim 5, and thus the chance of breakage is done away with inasmuch as it has been found by long practical use that a construction of this type, namely, the use of a complete supporting plate and double plate springing from the hub, is absolutely reliable. This feature of reliability is of peculiar importance in the present state of railway practice, inasmuch as the heavy loads now imposed upon car wheels and the high rates of travel which now obtain result in far more severe stresses in braking, and a greater generation of heat, than in the case of the slower speeds and lighter loads in vogue in previous times.

It may here be noted that the wheel may be lightened and many of the advantages of my invention retained by the elimination of one or more of the sets of brackets shown, although it has been found advantageous and conducive to a greater dependability to construct the same as above described. It may also be noted that many features of this invention are applicable to driving wheels and car wheels of types other than the double plate form shown, although certain advantages are inherent in its application in the relation described.

In Fig. 3 of the drawings is shown a slightly different embodiment of certain features of this invention, in which there is secured upon the wheel rim 18 an outer tire 19, preferably of steel, the same projecting beyond the surface of the braking ring 20, which is mounted in a manner substantially identical with that of the braking ring 7 above described.

It will thus be seen that I have provided apparatus in which all of the objects of my invention are attained and the above enumerated advantages are, among others, present. The construction is of the simplest and cheapest, and while presenting a radically new idea, nevertheless utilizes principles which have been found by long and extensive practice to be best suited for employment in this art. The thoroughly tested advantages of prior constructions are herein incorporated in a device in which the defects which have hitherto accompanied these advantages are eliminated, and this without a sacrifice of the eminently practical character of the apparatus.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:—

1. In apparatus of the class described, a car wheel having springing therefrom a plate and a braking ring mounted upon said plate.

2. In apparatus of the class described, a car wheel having springing therefrom an integral plate, and a braking ring mounted upon said plate.

3. In apparatus of the class described, a car wheel having a plate upon which the wheel rim is mounted, means connected with and spaced from said plate, and a braking ring mounted upon said means, said means being integral with the wheel body.

4. In apparatus of the class described, a car wheel having a plate upon which the wheel rim is mounted, means connected with and spaced from said plate, and a braking ring mounted upon said means, said means being integral with said braking ring.

5. In apparatus of the class described, a car wheel having a plate upon which the wheel rim is mounted, means connected with and spaced from said plate, and a braking ring mounted upon said means, said means being integral with the wheel body and with the braking ring.

6. In apparatus of the class described, in combination, a hub, a pair of plates springing therefrom, means connecting said plates one with another, means springing from said point of connection and having mounted thereon a wheel rim, and means springing from said point of connection and having mounted thereon a braking ring.

7. In apparatus of the class described, in combination, a hub, inner and outer plates integral therewith, an integral connection between said plates, integral means springing from said connection and having mounted thereon a wheel rim, and integral means springing from said connection and having mounted thereon a braking ring.

8. In apparatus of the class described, in combination, a hub, inner and outer plates springing therefrom, a connection between said inner and outer plates, and inwardly curved means springing from said connection and having mounted thereon a braking ring.

9. In apparatus of the class described, in combination, a hub, inner and outer plates springing therefrom, a connection between said inner and outer plates, and an inwardly curved plate springing from said connection and having mounted thereon a braking ring.

10. In apparatus of the class described, in combination, a hub, inner and outer plates springing therefrom, means connecting said inner and outer plates, means springing from said connection and having mounted thereon a wheel rim, and a plate springing from said connection and having mounted thereon a braking ring.

11. In apparatus of the class described, in combination, a hub, inner and outer plates springing therefrom, means connecting said inner and outer plates, means springing from said connection and having mounted thereon a wheel rim, and a plate springing from said connection and having mounted thereon a braking ring, said plate being integral with said ring and with the wheel body.

12. In apparatus of the class described, in combination, a hub, inner and outer plates springing therefrom, means connecting said inner and outer plates, a rim mounted upon said connecting means, and a relatively expansible braking member mounted upon said connecting means.

13. In apparatus of the class described, a car wheel having springing therefrom a plate, and a braking ring mounted upon said plate, the surface of said braking ring being chilled.

14. In apparatus of the class described, a car wheel having springing therefrom a plate, and a braking ring mounted upon said plate, said braking ring being spaced from the wheel rim.

15. In apparatus of the class described, in combination, a hub, a pair of plates springing therefrom, means connecting said plates one with another, means springing from said point of connection and having mounted thereon a wheel rim, and means springing from said point of connection and having mounted thereon a braking ring, said braking ring being spaced from said wheel rim.

16. In apparatus of the class described, in combination, a hub, inner and outer plates springing therefrom, means connecting said inner and outer plates, a rim mounted upon said connecting means, and a relatively expansible braking member mounted upon said connecting means, said braking member being spaced from said rim.

17. In apparatus of the class described, in combination, a hub, inner and outer plates springing from said hub, means connecting said inner and outer plates, a plurality of brackets extending about the space comprised within said hub, plates and connecting means, means extending from one of said plates and supporting a wheel rim, and means extending from the other of said plates and supporting a braking ring.

18. In apparatus of the class described, in combination, a wheel having mounted thereon a rim and a braking ring offset with respect thereto, and continuous brackets extending from said ring to said rim.

19. In apparatus of the class described, in combination, a wheel having a plate integral therewith, a braking ring mounted upon said plate, and curved brackets formed upon the surface of said plate.

20. In apparatus of the class described, in combination, a hub, inner and outer plates springing therefrom, means connecting said plates, said plates being extended beyond said connecting means, a wheel rim mounted upon one of said plates, a braking ring mounted upon the other of said plates, and curved brackets formed upon each of said plates.

21. In apparatus of the class described, in combination, a hub, inner and outer plates springing therefrom, means connecting said plates, said plates being extended beyond said connecting means, a wheel rim mounted upon one of said plates, a braking ring mounted upon the other of said plates, curved brackets formed upon each of said plates, and a plurality of brackets extending about the space comprised within said hub, plates and connecting means.

In testimony whereof I affix my signature, in the presence of two witnesses.

PATRICK H. GRIFFIN.

Witnesses:
H. M. SEAMANS,
R. S. BLAIR.

---

Corrections in Letters Patent No. 868,777.

It is hereby certified that in Letters Patent No. 868,777, granted October 22, 1907, upon the application of Patrick H. Griffin, of Buffalo, New York, for an improvement in "Braking Apparatus," errors occur in the printed specification requiring correction, as follows: In line 40, page 2, the word "on" should read *no*; and in line 49, same page, the word "absulutely" should read *absolutely*; and that the said Letters Patent should be read with these corrections therein that the same may conform to the record of the case in the Patent Office.

Signed and sealed this 12th day of November, A. D., 1907.

[SEAL.]

C. C. BILLINGS,
*Acting Commissioner of Patents.* nection between said inner and outer plates, and inwardly curved means springing from said connection and having mounted thereon a braking ring.

9. In apparatus of the class described, in combination, a hub, inner and outer plates springing therefrom, a connection between said inner and outer plates, and an inwardly curved plate springing from said connection and having mounted thereon a braking ring.

10. In apparatus of the class described, in combination, a hub, inner and outer plates springing therefrom, means connecting said inner and outer plates, means springing from said connection and having mounted thereon a wheel rim, and a plate springing from said connection and having mounted thereon a braking ring.

11. In apparatus of the class described, in combination, a hub, inner and outer plates springing therefrom, means connecting said inner and outer plates, means springing from said connection and having mounted thereon a wheel rim, and a plate springing from said connection and having mounted thereon a braking ring, said plate being integral with said ring and with the wheel body.

12. In apparatus of the class described, in combination, a hub, inner and outer plates springing therefrom, means connecting said inner and outer plates, a rim mounted upon said connecting means, and a relatively expansible braking member mounted upon said connecting means.

13. In apparatus of the class described, a car wheel having springing therefrom a plate, and a braking ring mounted upon said plate, the surface of said braking ring being chilled.

14. In apparatus of the class described, a car wheel having springing therefrom a plate, and a braking ring mounted upon said plate, said braking ring being spaced from the wheel rim.

15. In apparatus of the class described, in combination, a hub, a pair of plates springing therefrom, means connecting said plates one with another, means springing from said point of connection and having mounted thereon a wheel rim, and means springing from said point of connection and having mounted thereon a braking ring, said braking ring being spaced from said wheel rim.

16. In apparatus of the class described, in combination, a hub, inner and outer plates springing therefrom, means connecting said inner and outer plates, a rim mounted upon said connecting means, and a relatively expansible braking member mounted upon said connecting means, said braking member being spaced from said rim.

17. In apparatus of the class described, in combination, a hub, inner and outer plates springing from said hub, means connecting said inner and outer plates, a plurality of brackets extending about the space comprised within said hub, plates and connecting means, means extending from one of said plates and supporting a wheel rim, and means extending from the other of said plates and supporting a braking ring.

18. In apparatus of the class described, in combination, a wheel having mounted thereon a rim and a braking ring offset with respect thereto, and continuous brackets extending from said ring to said rim.

19. In apparatus of the class described, in combination, a wheel having a plate integral therewith, a braking ring mounted upon said plate, and curved brackets formed upon the surface of said plate.

20. In apparatus of the class described, in combination, a hub, inner and outer plates springing therefrom, means connecting said plates, said plates being extended beyond said connecting means, a wheel rim mounted upon one of said plates, a braking ring mounted upon the other of said plates, and curved brackets formed upon each of said plates.

21. In apparatus of the class described, in combination, a hub, inner and outer plates springing therefrom, means connecting said plates, said plates being extended beyond said connecting means, a wheel rim mounted upon one of said plates, a braking ring mounted upon the other of said plates, curved brackets formed upon each of said plates, and a plurality of brackets extending about the space comprised within said hub, plates and connecting means.

In testimony whereof I affix my signature, in the presence of two witnesses.

PATRICK H. GRIFFIN.

Witnesses:
H. M. SEAMANS,
R. S. BLAIR.

---

Corrections in Letters Patent No. 868,777.

It is hereby certified that in Letters Patent No. 868,777, granted October 22, 1907, upon the application of Patrick H. Griffin, of Buffalo, New York, for an improvement in "Braking Apparatus," errors occur in the printed specification requiring correction, as follows: In line 40, page 2, the word "on" should read *no*, and in line 49, same page, the word "absulutely" should read *absolutely*; and that the said Letters Patent should be read with these corrections therein that the same may conform to the record of the case in the Patent Office.

Signed and sealed this 12th day of November, A. D., 1907.

[SEAL.]

C. C. BILLINGS,
*Acting Commissioner of Patents.*

Corrections in Letters Patent No. 868,777.

It is hereby certified that in Letters Patent No. 868,777, granted October 22, 1907, upon the application of Patrick H. Griffin, of Buffalo, New York, for an improvement in "Braking Apparatus," errors occur in the printed specification requiring correction, as follows: In line 40, page 2, the word "on" should read *no*, and in line 49, same page, the word "absulutely" should read *absolutely;* and that the said Letters Patent should be read with these corrections therein that the same may conform to the record of the case in the Patent Office.

Signed and sealed this 12th day of November, A. D., 1907.

[SEAL.]

C. C. BILLINGS,
*Acting Commissioner of Patents*